Figure 6:
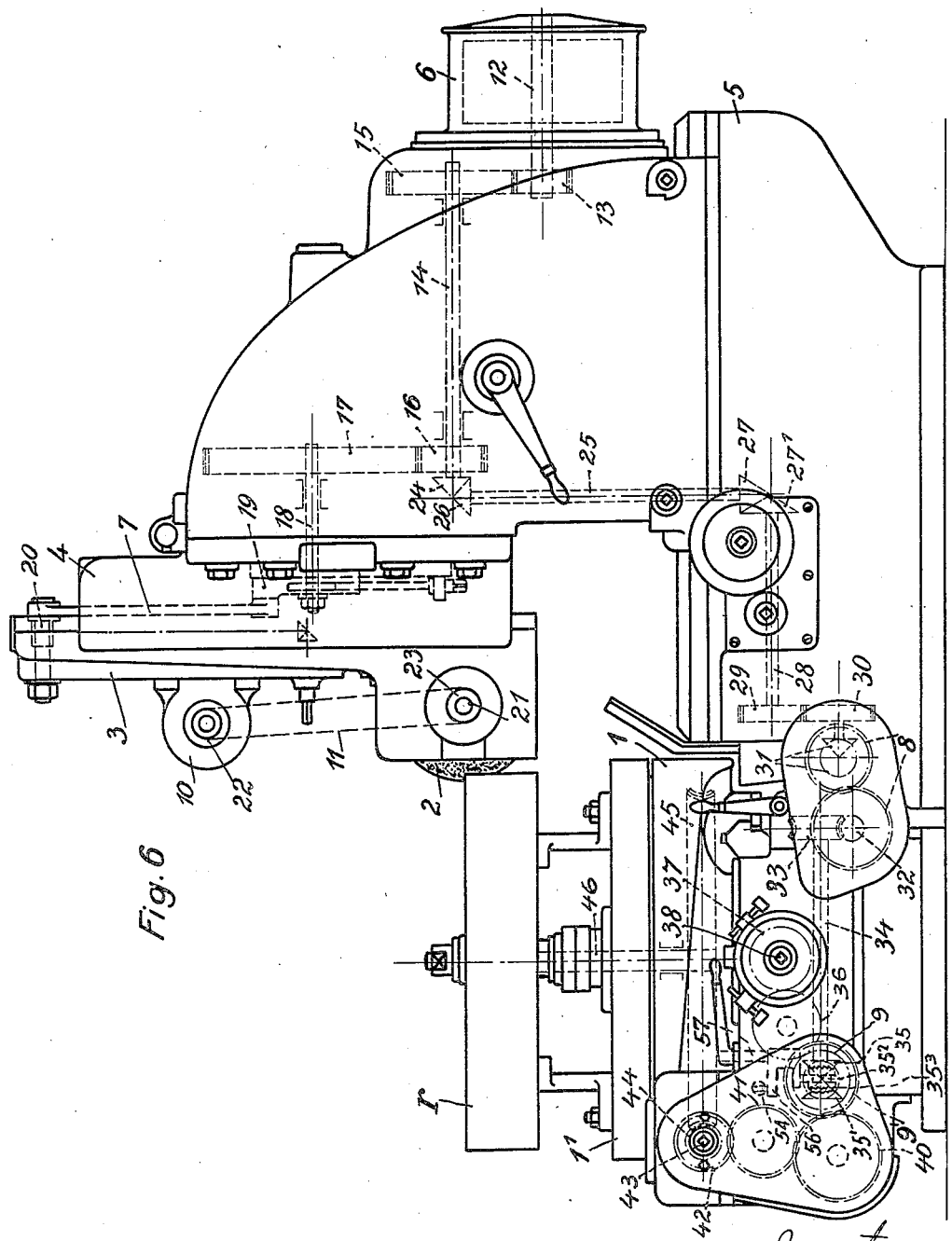

June 26, 1934.   P. UHLICH   1,964,233
METHOD OF GRINDING STRAIGHT AND HELICAL TEETH ON SPUR WHEELS
Filed Sept. 30, 1931   3 Sheets-Sheet 1
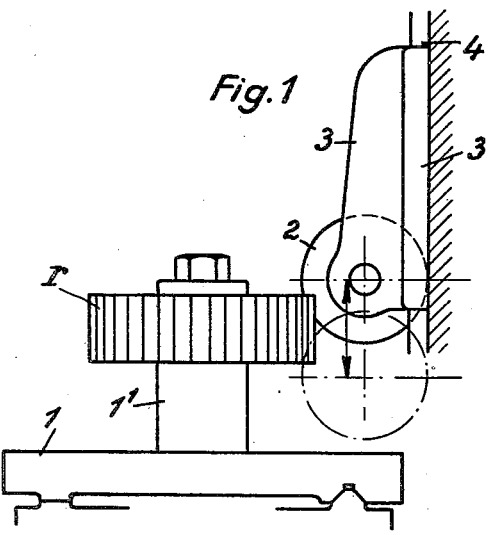
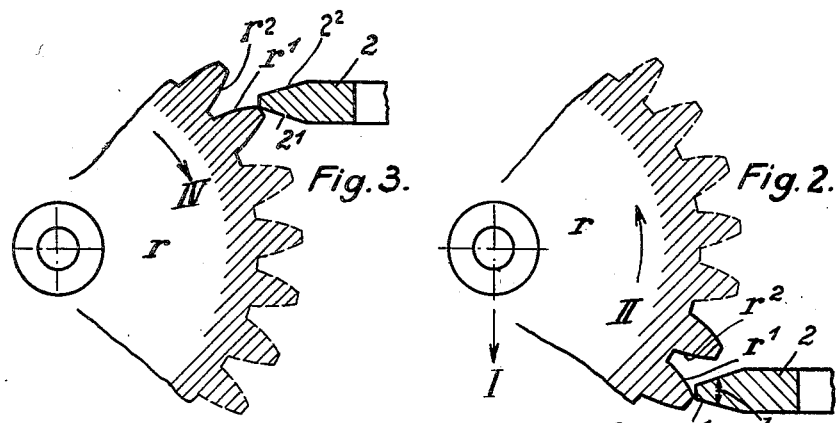
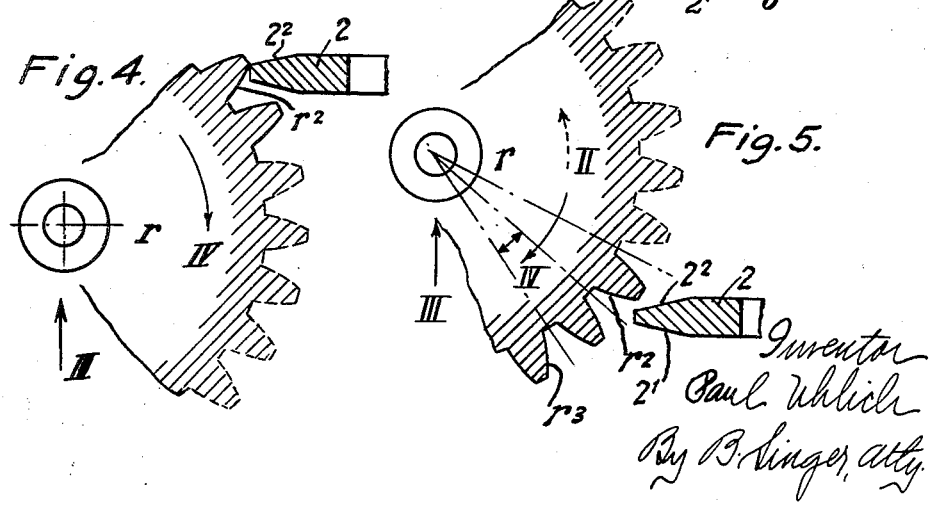
Inventor
Paul Uhlich
By B. Singer, atty.

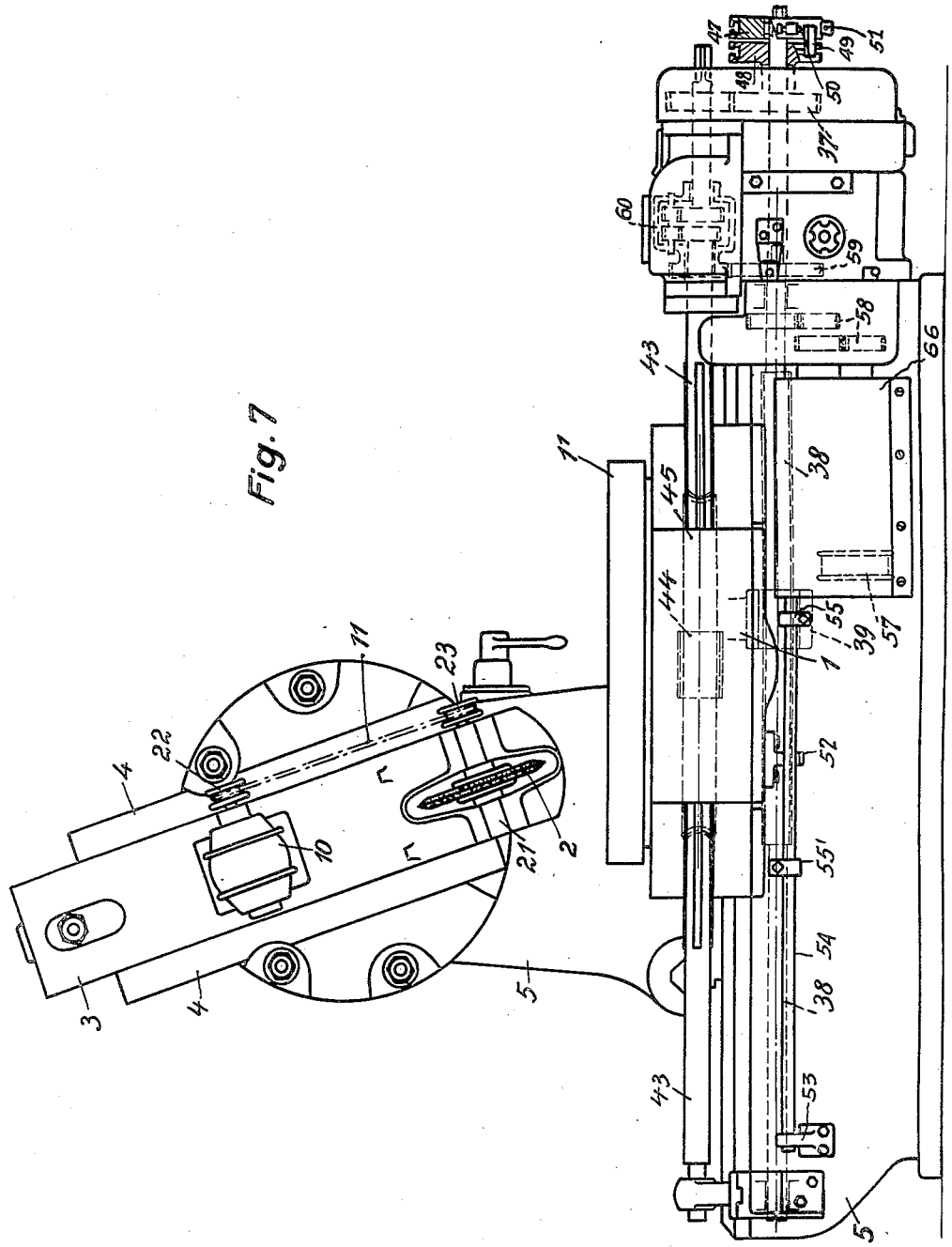

Patented June 26, 1934

1,964,233

UNITED STATES PATENT OFFICE 1,964,233

METHOD OF GRINDING STRAIGHT AND HELICAL TEETH ON SPUR WHEELS

Paul Uhlich, Weissensee, near Berlin, Germany, assignor to Deutsche Niles Werke Aktiengesellschaft, Weissensee, near Berlin, Germany Application September 30, 1931, Serial No. 566,081
In Germany February 28, 1931

2 Claims. (Cl. 51—278)

This invention relates to a method of grinding straight and helical teeth on spur wheels by the rolling off method and to an apparatus for carrying out the method according to the invention.

In the method according to the invention the wheel to be ground is rolled off in a known manner against a grinding disc of rack tooth section rotating and moving to and fro longitudinally of the teeth being ground.

Machines of this type are known. In these a grinding disc is employed which corresponds in thickness to the width of the toothed space, that is, it corresponds in its dimensions exactly to the tooth of a corresponding toothed rack. Both flanks of a toothed space are intended to be ground at a single rolling-off movement of the wheel. Since, however, the grinding disc wears away very rapidly and since also the two sides of a grinding disc may be differently worn, an accurate shape of the tooth cannot be obtained. In order to bring the sides of the grinding disc into contact with the flanks of the teeth when the disc has become worn, it is made manually axially adjustable so that there is no possibility of obtaining exactly equal thicknesses and shapes of the teeth.

These disadvantages are avoided by the method according to the invention.

The invention consists essentially in this, that the wheel is first of all rolled off on a grinding disc, the thickness of which measured in the pitch circle of the wheel is less than the width of a toothed space in the pitch circle, in such manner that one flank of the toothed space is completely worked, after which the rolling off movement is arrested and the wheel is turned round so far that the other flank of the toothed space comes into contact with the grinding disc, after which the wheel is rolled off in the opposite direction so that the other flank of the tooth is now completely worked. In order to move the wheel body forward by one or more tooth divisions it is, according to this invention, only necessary to roll off the wheel body from the grinding disc to such an extent that the latter passes out laterally over the addendum circle of the wheel.

A substantial advance due to the method according to the invention also is gained in that according to this method it is also possible to grind helical teeth.

The method according to the invention gives the advantage that the production of the accurate form of the tooth is independent of the thickness of the grinding disc and is not affected by errors arising on account of the dead motion and the like in the rolling off drive.

The invention also comprises a machine for carrying out the method described above.

In the drawing Fig. 1 illustrates diagrammatically an apparatus for carrying out the method according to the invention. Figs. 2–5 show different position of the wheel with respect to the grinding disc during the grinding process, Fig. 6 shows the constructional example of the machine for carrying out the method, in side elevation and Fig. 7 is a front elevation of Fig. 6.

As is shown in Fig. 1 the wheel $r$ to be ground, in this case a spur wheel with straight teeth, is secured to a longitudinally displaceable support 1, the part 1', of which together with the wheel body $r$ can be turned in opposite directions. The grinding disc 2 is rotatably mounted in a shoe 3 and is made to rotate rapidly in the known manner. The shoe 3 is slidable in a guide 4 and during the working process, that is when the grinding disc 2 engages in a tooth space of the wheel to be ground, has an uninterrupted up and down motion. As is clear from Fig. 1 the up and down motion is only so large that the grinding disc works a tooth flank in the whole breadth of the wheel but does not pass out of the teeth of the wheel.

The grinding disc 2 has a cross section which in its form corresponds to the tooth of a toothed rack corresponding to the wheel to be ground but is somewhat thinner than the theoretical toothed rack section (Figs. 2–5). In order to grind the teeth which have previously been cut or planed and to produce the form of the tooth automatically during the grinding process, the procedure is as follows.

The flank 2' of the grinding disc 2 is for example, brought into contact with the tooth flank $r'$ of a tooth space (Fig. 2). The wheel $r$ now receives a rolling motion with respect to an imaginary toothed rack, the one tooth of which is formed by the rotating grinding disc 2, which is moved up and down. This rolling movement is produced by the support 1 with the wheel body mounted on it being displaced in the direction of the arrow I (Fig. 2) and the wheel body being caused to rotate in the direction of the arrow II, to a corresponding extent. As soon as the wheel body has reached the position shown in Fig. 3 with respect to the grinding disc 2, the flank 2' of the latter has ground the tooth flank $r'$ in a manner corresponding to the involute shape of the tooth.

Since the breadth $b$ of the grinding disc measured at the pitch circle of the wheel is less than the size of a toothed space at the pitch circle, the wheel $r$ to be ground in order to grind flank $r^2$ of the same tooth space must be turned a corresponding distance in the direction of the arrow IV (Fig. 3), until the grinding disc 2 bears against the flank $r^2$ (Fig. 4). During this rotation of the wheel there is no longitudinal displacement of the latter.

The wheel $r$ is now displaced in the opposite direction with respect to the grinding disc 2, that is in the direction of the arrow III (Fig. 4), and at the same time is turned in the direction of the arrow IV to a corresponding extent in order to obtain an opposed rolling off movement, the flank $2^2$ of the grinding disc working the tooth flank $r^2$ of the same space. The rolling off movement in the direction of the arrow III is effected to such an extent that the grinding disc 2 no longer projects into the addendum circle of the toothed wheel $r$ (Fig. 5) as clearly explained below. The wheel $r$ can now be rotated freely and it is automatically moved forward in the direction of the arrow II by one tooth and given a further slight rotary movement in the same direction to bring the flank $2^1$ into operative relation with the flank $r^3$ of the next tooth. The two flanks of the next toothed space are then ground in the manner described above.

In order to grind helical teeth, the guide 4 of the grinding disc shoe 3 can be adjusted to correspond to the angle of inclination of the teeth and secured so that the direction of motion of the shoe 3, is no longer parallel to the axle of the wheel to be ground. The procedure is then the same as in grinding straight teeth (Fig. 7).

Referring now to Figs. 6 and 7, there is arranged at the frame 5 of the machine a driving motor (electromotor) 6, and to the shaft 12 of this motor is secured a cog-wheel 13 meshing with a larger cog-wheel 15 affixed to a shaft 14. The other end of this shaft is provided with a smaller cog-wheel 16 meshing with a considerably larger cog-wheel 17 secured to a short shaft 18, the other end of which is provided with a crank arm 19 to which is hinged a connecting rod 7, the other end of which is jointed to a pivot 20 arranged in a slide 3 guided rectilinearly between guide members 4 provided at the frame 5. The slide 3 is moved vertically to and fro by the driving members described. In the lower portion of the slide 3 is supported the grinding disk 2 upon an axle 21, and affixed to the slide is also a small driving motor (electromotor) 10, to the shaft of which a small pulley 22 is affixed. A belt 11 transmits the revolutions from the motor 10 to a small pulley 23 secured to the axle 21 of the grinding disk 2.

The shaft 14 is also provided with a bevel-wheel 24 meshing with a bevel-wheel 26 affixed to a vertical shaft 25 provided at its lower end with a bevel-wheel 27 meshing with another such wheel $27^1$ affixed to a horizontal shaft 28, to the other end of which is keyed a cog-wheel 29 meshing with a cog-wheel 30. The rotary motion is then further transmitted by a pair of bevel-wheels 31 to a set of change-speed wheels 8 by which the motion is further transmitted to a shaft 34 by means of a worm 32 and a worm-wheel 33. On the shaft 34 there are loosely turnable two bevel wheels 35, $35^1$, the opposed inner sides of which are provided with coupling teeth. Between these two bevel wheels a coupling sleeve $35^2$ is shiftably but not turnably arranged on the shaft 34. Both end faces of this coupling sleeve $35^2$ are also provided with coupling teeth. If, now the coupling sleeve $35^2$ is brought into engagement either with the bevel wheel 35 or with the bevel wheel $35^1$, a third bevel wheel $35^3$, that engages these two bevel wheels, is turned in the one or the other direction. With the bevel wheel $35^3$ there are firmly connected two toothed wheels 9 and $9^1$. The wheel 9 drives by means of intermediate wheels 36 and 37 a threaded spindle 38 in the one or the other direction. This spindle, on which the toothed wheel 37 is turnable, is journalled in the machine frame 5.

To the bottom of the support 1 is secured a nut 39 (Fig. 7) which encompasses the threaded spindle 38 and is moved axially thereon when this spindle is rotated, whereby the support 1 is shifted in the one or the other direction relatively to the grinding disk. By exchanging the change-speed wheels 8 the extent or the speed of the transversal shifting of the support 1 with the cog-wheel $r$ to be ground and affixed to it can be varied as desired.

The cog-wheel $9^1$ is used for rotating a shaft 43 by the intermediary of change-speed wheels 40, 41 and 42. A worm 44 is shiftably but not rotatably mounted on said shaft 43. Said worm is in gear with a worm-wheel 45 secured to the vertical shaft 46 of the rotary support $1^1$ which carries the wheel $r$ to be ground. By exchanging the change-speed wheels 40, 41 and 42 the extent or the speed of the rotary movement of the support $1^1$ in the one or the other direction can be varied as required.

During the transverse movement of the support 1 with the wheel $r$, for instance in the direction of the arrow I (Fig. 2), a driver 52 provided on the support 1 strikes against a stop 55 which is adjustably arranged on a shiftable rod 54 guided in brackets 53 in the machine frame 5. Only one of these brackets 53 is shown in Fig. 7. One end of the rod 54 is hinged to a two-armed coupling-lever 56 (Fig. 6) which is turnable on a vertical axle 57. One arm of the coupling-lever 56 engages the coupling-sleeve $35^2$. By the action of the stop 55 and the rod 54 the coupling-sleeve $35^2$ is disengaged from the bevel wheel 35 and engaged to the other bevel wheel $35^1$. Thus, the rotary movement of the threaded spindle 38 and the worm shaft 43 is reversed.

On the threaded spindle 38 are arranged two discs 47, 48 each having a groove at the circumference. The disc 47 is securely keyed to the end of the threaded spindle 38 while the disc 48 is freely rotatable thereon. The toothed wheel 37 is rigidly connected to the disc 48. A stop 49 is adjustable in the groove of the disc 48 while in the groove of the disc 47 two stop screws 50, 51 are arranged adjustably and securably.

As soon as the coupling sleeve $35^2$ has been shifted in the manner described, the worm shaft 43 and hence the wheel $r$ are turned in opposite directions. The disc 48 however is turned loosely on the spindle 38, whereby the stop member 49 is moved from the one stop screw, say 50, up to the other stop screw, say 51. During that time the wheel $r$ is rotated to such an extent, that the tooth flank $r^2$ is brought into contact with the surface $2^2$ of the grinding disc 2 (Fig. 4). At this moment the stop member 49 strikes against the stop screw 50 and the threaded spindle 38 is also rotated in the opposite direction.

By means of the stop screws 50, 51 the amount of the rotary movement of wheel $r$ without transverse movement of the latter is determined.

The operation of the parts described is as follows:

If, for example, it is assumed that the coupling sleeve $35^2$ on the shaft 34 engages the coupling teeth of the bevel wheel 35, the threaded spindle 38 and the worm shaft 43 are turned in such a manner that the wheel $r$ rolls off in the direction of the arrows I and II (Fig. 2) against the grinding disc 2. Hereby the surface $2^1$ of the grinding disc moves over the flank $r^1$ of the tooth and works this flank completely until the position shown in Fig. 3 is reached. At this moment the driver 52 (Fig. 7) strikes against the adjustable stop 55 and by the longitudinal displacement of the rod 54 the drive of the threaded spindle 38 and the worm shaft 43 is reversed in the manner described. The wheel $r$ to be ground is now turned in the direction of the arrow IV (Fig. 3) to such an extent that the tooth flank $r^2$ is brought into contact with the flank $2^2$ of the grinding disc (Fig. 4). During this rotary movement of the wheel $r$ the stop 49 of the loosely arranged disc 48 has been turned from the stop screw 50 to the stop screw 51 of the disc 47 which is fixed to the spindle 38 and now the latter is turned in the opposite direction. Thus, the support 1 carrying the wheel $r$ is moved in the direction of the arrow III and as the rotary movement of the wheel $r$ in the direction of the arrow IV (Fig. 4) is continued, a rolling off movement of the wheel $r$ in the opposite direction is performed. Hereby the surface $2^2$ of the grinding disc moves over the tooth flank $r^2$ and works this flank completely until the grinding disc 2 just leaves the addendum circle of the toothed wheel. At this movement the driver 52 strikes against the adjustable stop $55^1$ (Fig. 7) and by the displacement of the rod 54 the coupling sleeve $35^2$ is shifted. Hereby the drive of the threaded spindle 38 and the worm-shaft 43 is reversed again.

The stops 55 and $55^1$ are set on the displaceable bar 54 in such manner that the inversion of the bushing $35^2$ takes place after a longer period when the wheel $r$ revolves in one direction than when the same wheel revolves in the opposite direction. The revolving movement, therefore, in one direction is greater than in the other in order to permit at the end of the greater revolving movement turning of the wheel $r$ relatively to the grinding disc 2 the distance of one tooth division. For this purpose an indexing mechanism of well known construction and as used in gear cutting machines is provided in the machine. This indexing mechanism is enclosed in a casing 66 attached to the machine frame 5 and is driven by a small electromotor 57.

As soon as the drive of the threaded spindle 38 and of the worm shaft 43 is reversed and the stop 49 is moved from the stop screw 51 to the stop screw 50, the work piece is rotated by the shaft 43 to such an extent in the direction of the arrow II, that the other flank $r^1$ of the same tooth space is brought again into the range of the grinding disc 2. At the same time the indexing mechanism drives by means of the intermediate wheels 58, 59 a sun and planet wheel gearing 60 arranged on the shaft 43. The latter receives by means of this gearing 60 an additional rotary movement to such an extent that the work piece $r$ is rotated in the direction of the arrow II (Fig. 5) by one tooth division. Thus, the tooth flank $r^3$ of the next tooth space is brought into corresponding relation to the grinding disc 2.

When the stop 49 strikes against the stop screw 50 the support 1 with the work piece is transversely moved in the direction of the arrow I (Fig. 2) and as the rotary movement of the work piece $r$ in the direction of the arrow II is continued, a rolling off motion of the work piece in the direction of the arrows I and II is performed to grind the flank $r^3$.

I claim:

1. A method of grinding straight and helical teeth on spur wheels in which the wheel to be ground is rolled off against a rotating grinding disc which is moved to and fro longitudinally of the teeth being ground, consisting in rolling off the work piece on a grinding disc, the thickness of which measured in the pitch circle is less than the width of a toothed space in the pitch circle, in such manner that the one tooth flank of one toothed space is completely worked, then interrupting the rolling off movement of the work piece and turning the latter until the other tooth flank of the same toothed space comes into contact with said grinding disc, and then rolling off the work piece in the opposite direction in such manner that the other tooth flank is completely worked.

2. A method of grinding straight and helical teeth on spur wheels in which the wheel to be ground is rolled off against a rotating grinding disc which is moved to and fro longitudinally of the teeth being ground, consisting in rolling off the work piece on a grinding disc, the thickness of which measured in the pitch circle is less than the width of a toothed space in the pitch circle, in such manner that the one tooth flank of one toothed space is completely worked, then interrupting the rolling off movement of the work piece and turning the latter until the other tooth flank of the same toothed space comes into contact with said grinding disc, then rolling off the work piece in the opposite direction in such manner that the other tooth flank is completely worked, and that the said grinding disc passes out laterally over the addendum circle of the work piece, whereupon this rolling off movement is interrupted and the work piece is turned by one tooth division and so far that the opposite tooth flank of the next toothed space comes into corresponding relation to the grinding disc.

PAUL UHLICH.